(12) United States Patent
Miller (10) Patent No.: US 9,765,758 B2
(45) Date of Patent: Sep. 19, 2017

(54) COMPRESSED GAS ENGINE (71) Applicant: Michael Miller, Annapolis, MD (US)

(72) Inventor: Michael Miller, Annapolis, MD (US)

( * ) Notice: Subject to any disclaimer, the term of this patent is extended or adjusted under 35 U.S.C. 154(b) by 239 days.

(21) Appl. No.: 14/582,234

(22) Filed: Dec. 24, 2014

(65) Prior Publication Data
US 2016/0186567 A1    Jun. 30, 2016

(51) Int. Cl.
| | | |
|---|---|---|
| F01D 1/18 | (2006.01) |
| F01D 17/10 | (2006.01) |
| F03G 3/00 | (2006.01) |
| F03G 7/10 | (2006.01) |

(52) U.S. Cl.
CPC ....... *F03G 3/00* (2013.01); *F03G 7/10* (2013.01)

(58) Field of Classification Search
CPC . F03B 17/005–17/04; F03G 3/02; F03G 3/08; F03G 7/08; F03G 7/10
USPC ........... 60/495–507, 675, 371–372, 639–640
See application file for complete search history.

(56) References Cited

U.S. PATENT DOCUMENTS

| | | |
|---|---|---|
| 243,909 A | 7/1881 | Iske |
| 458,872 A | 9/1891 | Van Depoele |
| 3,358,451 A | 12/1967 | Feldman et al. |
| 3,441,482 A | 4/1969 | Avery |
| 3,546,473 A | 12/1970 | Rich |
| 3,636,706 A | 1/1972 | Minto |
| 3,659,416 A | 5/1972 | Brown |
| 3,901,033 A | 8/1975 | Mcalister |
| 3,975,097 A | 8/1976 | Minto |
| 4,051,678 A | 10/1977 | Yates |
| 4,131,171 A | 12/1978 | Keyes |
| 4,291,755 A | 9/1981 | Minto |
| 4,326,132 A * | 4/1982 | Bokel ............... F03B 17/02 290/1 R |
| 4,342,920 A | 8/1982 | Bucknam |
| 4,399,368 A | 8/1983 | Bucknam |
| 4,403,643 A | 9/1983 | Minto |
| 4,637,211 A | 1/1987 | White et al. |
| 5,028,903 A | 7/1991 | Aubert |
| 5,216,401 A | 6/1993 | Leupold |
| 5,228,293 A | 7/1993 | Vitale |
| 5,382,936 A | 1/1995 | Leupold et al. |

(Continued)

FOREIGN PATENT DOCUMENTS

| | | |
|---|---|---|
| GB | 1251484 A | 10/1971 |
| GB | 1301214 A | 12/1972 |

OTHER PUBLICATIONS

International Search Report and Written Opinion in PCT Application PCT/US08/54243 mailed Jul. 18, 2008.

(Continued)

*Primary Examiner* — Mark Laurenzi
*Assistant Examiner* — Mickey France
(74) *Attorney, Agent, or Firm* — George Willinghan (57) ABSTRACT

An engine has two pressure vessels arranged as a diametrically opposed pair. Each pressure vessel has an operating pressure sufficient to hold gas at a pre-defined pressure. At least one gas compressor is in communication with each pressure vessel, and the gas compressor is capable of compressing a gas in each pressure vessel to the pre-defined pressure. A pressure relief mechanism is in communication with each pressure vessel. The pressure relief mechanism is capable of returning the gas in each vessel to atmospheric pressure.

20 Claims, 4 Drawing Sheets

(56) References Cited

U.S. PATENT DOCUMENTS

| | | |
|---|---|---|
| 5,428,334 A | 6/1995 | Leupold et al. |
| 5,428,335 A | 6/1995 | Leupold et al. |
| 5,461,354 A | 10/1995 | Rosenberg et al. |
| 5,506,558 A | 4/1996 | Laube |
| 5,517,083 A | 5/1996 | Whitlock |
| 6,286,310 B1 | 9/2001 | Conrad |
| 6,688,048 B2 | 2/2004 | Staschik |
| 6,978,610 B2 | 12/2005 | Carnahan |
| 7,644,648 B2 | 1/2010 | Minowa et al. |
| 7,692,320 B2 | 4/2010 | Lemieux |
| 2002/0100576 A1 | 8/2002 | Hua |
| 2004/0140875 A1 | 7/2004 | Strom |
| 2005/0246919 A1 | 11/2005 | Delons |
| 2005/0252206 A1* | 11/2005 | Holmevik ............... F03B 17/02 60/495 |
| 2006/0225414 A1* | 10/2006 | Fan ............... F03G 3/00 60/407 |
| 2009/0309371 A1* | 12/2009 | Ballard ............... F02C 1/02 290/1 R |
| 2011/0041499 A1* | 2/2011 | Godwin ............... F03G 7/06 60/639 |
| 2011/0169277 A1* | 7/2011 | Miller ............... F01K 25/10 290/1 R |
| 2013/0062457 A1* | 3/2013 | Deakin ............... B64B 1/08 244/25 |
| 2013/0205768 A1* | 8/2013 | Kim ............... F03B 17/00 60/495 |
| 2013/0270835 A1* | 10/2013 | Pingitore ............... F03B 17/005 290/1 A |
| 2014/0109991 A1* | 4/2014 | Travis ............... F03B 17/02 137/343 |
| 2015/0211479 A1* | 7/2015 | Tai ............... F03B 17/02 60/496 |

OTHER PUBLICATIONS

Minto wheel from The Mother Earth News, Issue 40, Jul. 1976.
Wallace Minto: Freon Power wheel from wwww.rexresearch.com (37 pages).
Wally Minto's Wonder Wheel, Popular Science, Mar. 1976.

* cited by examiner

COMPRESSED GAS ENGINE

FIELD OF THE INVENTION

The present invention is directed to engines and compressed gas systems.

BACKGROUND OF THE INVENTION

A slow moving, high torque engine or generator is known that operates on a very small temperature differential. This engine is commonly referred to as a Minto Wheel after its inventor Wallace Minto. The engine is arranged as a wheel that contains a series of sealed containers. The sealed containers are placed around the rim of the wheel and are aligned as diametrically opposed pairs. Each diametrically opposed pair is in fluid connection through a tube. The wheel rotates in a vertical plane. In any given pair at any given moment in time during the rotation, one of the containers is moving in a generally upward direction, and the other container is moving in a generally downward direction. At one position in the rotation, the containers are aligned vertically, with one container at the top being in the uppermost position and one container at the bottom being in the lowermost position. Each container moves between the uppermost and lowermost positions.

Each opposed pair of containers and the associated connecting tube form a sealed unit. Into each sealed unit a volume of a low-boiling liquid, for example propane, butane, carbon dioxide or Freon is introduced. For a given pair located at or near the vertically aligned position, most of the introduced volume of liquid is disposed in the lowermost container. The lowermost container is then exposed to a very mild increase in temperature, for example an increase of as little as 2° centigrade or about 3.5° F. The small temperature increase in the liquid in the lowermost container vaporizes a portion of the liquid, producing a higher pressure on the surface of the liquid. This pressure forces the liquid up the connecting tube and into the uppermost container. This transfer of liquid from the lowermost container to the uppermost container transfers mass to the uppermost container, causing the container to increase in weight while the lowermost container decreases on weight. Gravity pulls the uppermost container downward, turning the wheel in a manner similar to the turning of a water wheel. This rotational motion can be used for any desired mechanical work. Wheels of modest size can perform such tasks as pumping water for irrigation, grinding food grains and generating small amounts of machine power. The wheel turns relatively slowly, but produces enormous torque. This high torque rotational motion can be geared up to produce any speed desired at the final output shaft. Although output can be converted to higher speeds, the wheel or engine is most effective for applications that utilize high torque at low speed.

The horsepower produced by the rotating wheel is proportional to the product of torque and speed, i.e. revolutions per minute of the wheel. For a given wheel exposed to a given temperature difference between opposed containers, a particular maximum horsepower is produced when fully loaded. This maximum horsepower, i.e. the power output, of the wheel is proportional to the rate of heat transfer. Therefore, arrangements of an engine or generator that are not constrained by the rate of heat transfer into and out of a liquid are desired.

SUMMARY OF THE INVENTION

Systems in accordance with exemplary embodiments of the present invention utilize compressed gas and the weight increase associated with compressing a gas within a pressure vessel of fixed volume to transfer weight into and out of a pressure vessel. These pressure vessels are utilized in an engine that harvests the effects to gravity due to the increased weight of the pressure vessels. In one embodiment, a compressed air cycle is utilized to transfer or establish a mass of compressed air at a given pre-determined height. The resultant potential energy is then reclaimed as the weighted pressure vessel descends from the pre-determined height. Once the pressure vessel completely descends, the pressurized gas is vented, for example to the atmosphere, returning the mass of the pressure vessel to its pre-pressurized level. Additional energy can be recaptured from the gas pressurization cycle by utilizing the resultant heat transfer or by using the released pressurized gas to drive, for example, a turbine.

In accordance with one exemplary embodiment, the present invention is directed to an engine having two pressure vessels arranged as a diametrically opposed pair. Each pressure vessel has an operating pressure sufficient to hold gas at a pre-defined pressure. At least one gas compressor is in communication with each pressure vessel, or sequentially so, and the gas compressor is capable of compressing a gas in each pressure vessel at to the pre-defined pressure when the pressure vessel is at a pre-determined height in order to provide additional mass and the associated increase in potential energy in that pressure vessel when it is at that pre-determined height. A pressure relief mechanism is in communication with each pressure vessel, or sequentially so. The pressure relief mechanism is capable of returning the gas in each vessel to atmospheric pressure, or nearly so, at a point lower than the pre-determined height in a manner such that the potential energy is recovered at least in part and converted to mechanical energy. In one embodiment, the release of pressure is directed through a pneumatic generator which in operation utilizes a certain velocity of gas released into the pneumatic generator.

In accordance with one exemplary embodiment, the present invention is directed to an engine having two pressure vessels arranged as a diametrically opposed pair. Each pressure vessel has an operating pressure sufficient to hold gas at a pre-defined pressure. Suitable gases include air and argon. In one embodiment, the pre-defined pressure is at least about 2000 psi. In another embodiment, the pre-defined pressure is at least about 3000 psi. In one embodiment, each pressure vessel is sufficient to hold at least about 80 cubic feet of the gas at the pre-defined pressure. In one embodiment, the gas at the pre-defined pressure has a weight of at least about 3 pounds, preferably at least about 5 pounds.

The engine also includes at least one gas compressor in communication with each pressure vessel. The gas compressor is capable of compressing a gas in each pressure vessel to the pre-defined pressure. A pressure relief mechanism is provided in communication with each pressure vessel. The pressure relief mechanism is capable of returning the gas in each vessel to atmospheric pressure. In one embodiment, the engine includes a plurality of pressure vessels arranged in a plurality of diametrically opposed pairs. An arm is attached to both pressure vessels in each diametrically opposed pair such that each pressure vessel in each diametrically opposed pair is disposed on either end of the arm, and a rotatable shaft is provided in contact with each arm at a point along the arm between the two pressure vessels. Each arm is shaped to engage the shaft to impart rotational motion from the arm to the shaft during at least a portion of each rotation of the each around the shaft. In one embodiment, each arm has a length of at least about 100 feet. In one embodiment, at least one pneumatic powered electric generator is provided in communication with the pressure relief mechanism. In another embodiment, a gas storage tank is provided in communication with the pressure relief mechanism and the gas compressor.

Exemplary embodiments in accordance with the present invention are also directed to an engine having a continuous vertical conveyor with a pre-determined height and a plurality of pressure vessels connected to the continuous vertical conveyor for transport by the continuous vertical conveyor to and from the pre-determined height, e.g., at least about 100 feet. Each pressure vessel has an operating pressure sufficient to hold gas, e.g., air or argon, at a pre-defined pressure. In one embodiment, the gas at the pre-defined pressure has a weight of at least about 5 pounds. At least one gas compressor is provided in communication with each pressure vessel. The gas compressor is capable of compressing a gas in each pressure vessel to the pre-defined pressure. A pressure relief mechanism is provided in communication with each pressure vessel. The pressure relief mechanism is capable of returning the gas in each vessel to atmospheric pressure.

In one embodiment, the continuous vertical conveyor contains a first rotatable wheel, a second rotatable wheel disposed vertically above the first rotatable wheel and a belt disposed around the first rotatable wheel and the second rotatable wheel. Rotation of the belt about the first rotatable wheel and the second rotatable wheel moves any given point along the belt to and from the pre-determined height. The plurality of pressure vessels is attached to the belt at a plurality of distinct points along the belt. In one embodiment, the plurality of distinct points are spaced apart by a distance of about one foot along the belt. In one embodiment, the engine includes an electrical generator in communication with at least one of the first rotatable wheel and the second rotatable wheel. In one embodiment, the engine includes at least one pneumatic powered electric generator in communication with the pressure relief mechanism.

DETAILED DESCRIPTION

Systems and methods in accordance with exemplary embodiments of the present invention are directed to a pneumatic "Minto Wheel" engine that utilizes compressed gas, and in particular, the increase in weight achievable by compressing the gas in a pressure vessel of a given size. The gas is compressed in a pressure vessel, for example, a metal cylinder or sphere such as a steel or aluminum cylinder or sphere. This increases the weight of the pressure vessel. The gas is compressed when the pressure vessel is located at a predetermined height, for example, about 100, 150, 200, 300 or 400 feet. The elevated pressure vessel with increased weight is in a state of potential energy based on the effect of gravity upon the pressure vessel. This potential energy is captured by allowing the pressure vessel to fall and accelerate downward under the effects of gravity. The captured potential energy is converted to usable work through the arms of the "Walley Wheel" or through a pulley and belt or chain system to which the pressure vessel is attached. In addition, a portion of the recaptured potential energy is used to return the depressurized pressure vessels to the predetermined height.

Preferably, a plurality a pressure vessels are attached to a given wheel, for example in diametrically opposed pairs, or to a pulley and belt system. The gas in each pressure vessel is pressurized when that pressure vessel is located at the pre-determined height in an uppermost position. At the bottom of the cycle in a lowermost position, the compressed gas is allowed to be decompressed through a pressure relief mechanism attached to the pressure tank, to return the gas in the pressure vessel to atmospheric pressure. In one embodiment, the pressure relief mechanism is in communication with a pneumatic powered electrical generator to generate electricity while returning the gas in the pressure vessel to atmospheric pressure and the pressure vessel to its original weight. The wheel or pulley and belt system transports the empty cylinders up to the predetermined height under the rotation of the wheel or belt and pulley system driven by the descending of pressure vessels containing the pressurized gas.

In one embodiment, the pulley and belt system is vertically aligned with a plurality of pressure vessels attached along the length of the belt that rotates around the pulleys. Pressure vessels containing the pressurized gas pass down on one side of the pulley and belt system, and the pressure vessels with gas at atmospheric pressure are carried up on the other side. At the top the gas in each pressure vessel is compressed to a pre-defined working pressure using a gas compressor, for example, an electric gas compressor, to provide the increased weight to the pressure vessel. Suitable sources for the electricity to run the gas compressor include, but are not limited to, electricity generated by the decompression of the pressure vessels through the pneumatic powered electric generator at the bottom of the rotation cycle and electricity generated by the wheel or pulley and belt system itself through gears that mechanically power an electrical generator.

The amount of work or power generated is proportional to the height of the system, i.e., the height at which the gas in the pressure vessels is pressurized. Other contributing factors include the capacity or volume of the pressure vessel, the operating pressure of the pressure vessel, the gas being compressed, e.g., air versus a noble gas, the type of wheel or pulley and belt system used, the efficiency of the electric gas compressors and of the pneumatic powered electrical generators. In addition to remaining fixed to the wheel or pulley and belt system, each pressure vessel can be removed from the system for purposes of gas pressurization or decompression and then reattached. Therefore, the wheel or belt and pulley system can rotate continuously and is not affected by the time associated with pressurization and decompression. The system by which charged or decompressed pressure vessels are put into or taken out of the system in order that they may be charged or discharged will also contribute to the efficiency of the system.

In one embodiment, a pressure vessel is used that has an 80 cubic foot capacity at 3000 psi. For air, this pressure vessel has a pressurized weight that is about 5 to 6 pounds heavier that its decompressed state. For a pressure vessel holding about 130 cubic feet of pressurized air, the increase in weight is from about 9 or 10 pounds. In general, one cubic foot of air weighs 0.0807 lbs. at standard pressure and temperature (STP). Pressurizing approximately 80 cubic feet of air in pressure vessel, for example an aluminum tank, at 2400 psi yields a weight of approximately 6.4 pounds for the pressurized air in the pressure vessel. The same 80 cubic foot capacity pressure vessel produces a weight difference of about 8.2 pounds when the gas is Argon. For a pulley and belt system with a pre-determined height of 100 feet, 100 pressurized pressure vessels are placed along one side of the belt spaced apart by one foot. For a 5 pound pressurized weight differential in each pressure vessel, the amount of work is about 50,000 foot pounds. Increasing the height to 200 feet and the number of pressure vessels to 200 increases the work to about 200,000 foot pounds. An array of 10 identical wheels or pulleys along a common axis yields 10 times the work, or about 2,000,000 foot pounds of work.

Figure 1:
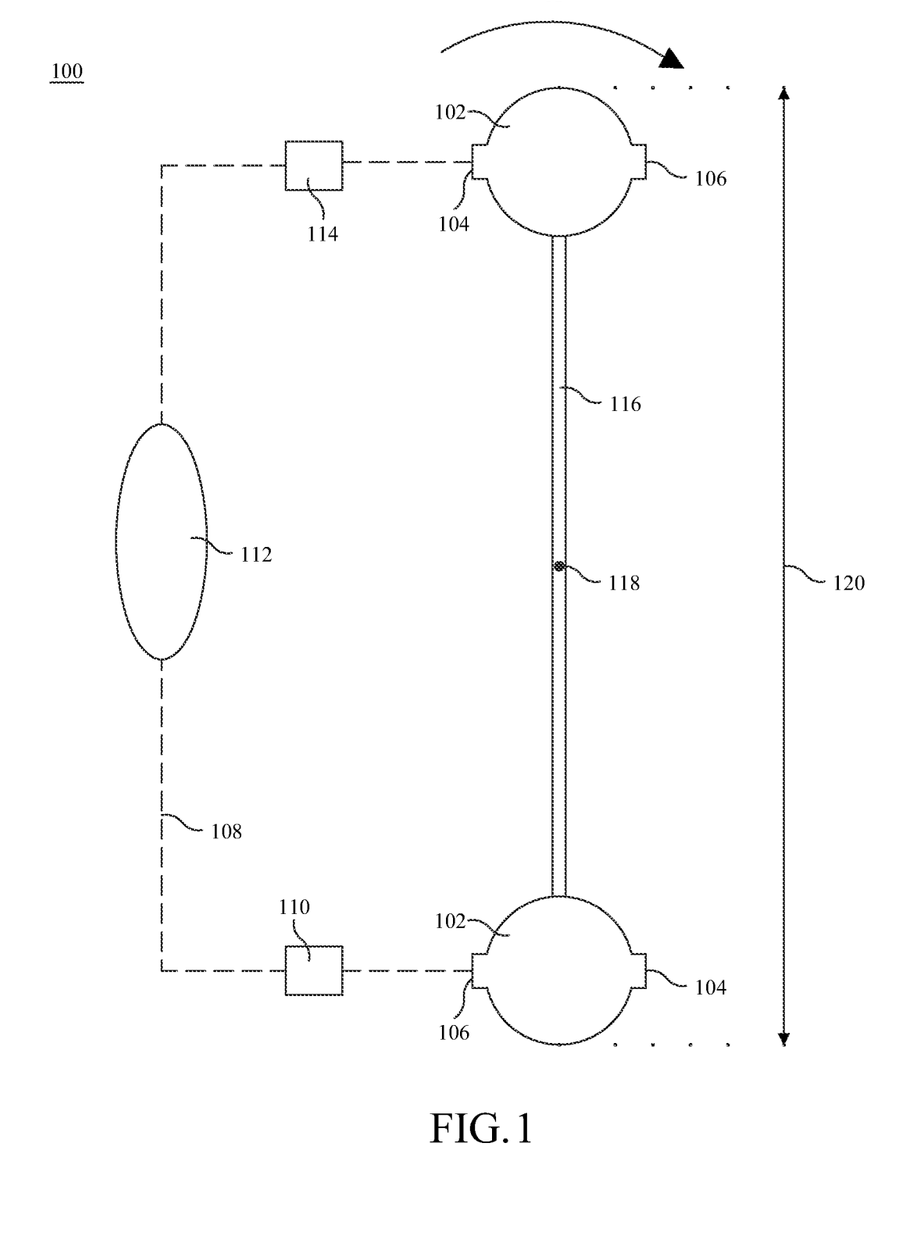
FIG. 1 is a schematic representation of an embodiment of an engine in accordance with the present invention.

Referring initially to FIG. 1, a compressed gas engine 100 in accordance with one exemplary embodiment of the present invention includes at least two pressure vessels 102 arranged as a diametrically opposed pair one each end of an arm 116. Each pressure vessel has an operating pressure sufficient to hold gas at a pre-defined pressure. In one embodiment, the pre-defined pressure is at least about 2000 psi. In another embodiment, the pre-defined pressure is at least about 3000 psi. In one embodiment, each pressure is sufficient to hold at least about 80 cubic feet of the gas at the pre-defined pressure. In another embodiment, each pressure is sufficient to hold at least about 100 cubic feet of the gas at the pre-defined pressure. In one embodiment, the gas at the pre-defined pressure comprises a weight of at least about 3 pounds, preferably at least about 5 pounds, more preferably at least about 10 pounds. Suitable gases include, but at not limited to, air, helium (He), neon (Ne), argon (Ar), krypton (Kr) and xenon (Xe). In one embodiment, the gas is the refrigerant R123, which has a specific gravity that is about 5.279 times greater than air.

The engine also includes at least one gas compressor 114 in communication with pressure inlet 104 of each the pressure vessel through pressure lines 108, preferably when each pressure vessel is located at the pre-determined height 120. Suitable pre-determined heights include at least 100 feet, at least 150 feet, at least 200 feet, at least 300 feet and at least 400 feet. The arm is sized to space the diametrically opposed pairs apart a distance corresponding to this pre-determined height. Suitable gas compressors include electrical gas compressors, including energy efficient or low power gas compressors and are known and available in the art. The gas compressor is capable of compressing a gas in each pressure vessel to the pre-defined pressure. The engine can include a single gas compressor that engages the pressure inlet of each pressure vessel when that pressure vessel reaches the pre-determined height. Alternatively, the gas compressor is mounted on the arm, for example at the central axis, and is in communication with each pressure vessel. In one embodiment, a separate gas compressor is mounted on each pressure vessel.

The engine also includes a pressure relief mechanism 106 in communication with each pressure vessel, the pressure relief mechanism capable of returning the gas in each vessel to atmospheric pressure. Suitable pressure relief mechanisms include, but are not limited to, valves including pressure relief valves. In one embodiment, the pressure vessels rotate in the direction of arrow A about the central axis 118 of the arm between the pre-determined height and a bottom position. The central axis is in communication with gearing, arms and shafts, including cam shafts that translate the rotation of the arm and pressure vessels to the desired equipment including an electrical generator.

In one embodiment, the engine includes at least one pneumatic powered electric generator 110 in communication with the pressure relief mechanism 106 through the pressure lines 108. Suitable pneumatic powered electric generators are known and available in the art. In one embodiment, the engine includes a gas storage tank 112 in communication with the pressure relief mechanism and the gas compressor through the pressure lines 108. The gas storage tank holds the expanded depressurized gas at atmospheric pressure, for example, when the gas used is not air, e.g., argon. In one embodiment, active or passive heat exchanges are provided in communication with the pressure vessels to assist with the transfer of heat into and out of the system resulting from the compression and expansion of the gas in the pressure vessels. Suitable active and passive heat exchangers are known and available in the art.

Figure 2:
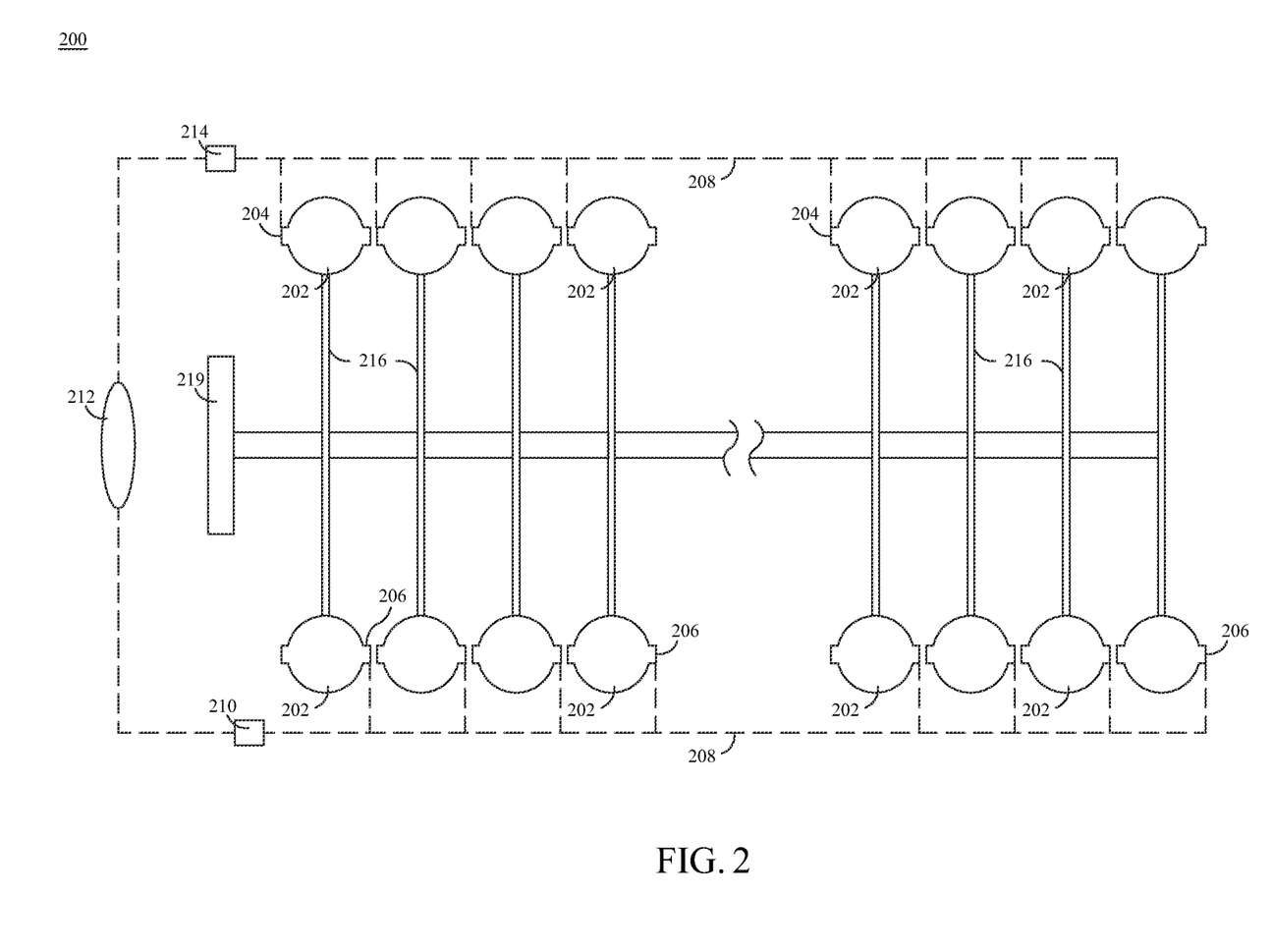
FIG. 2 is a view of another embodiment of the engine in accordance with the present invention.

Referring to FIG. 2, in another exemplary embodiment, the present invention is directed to an engine 200 having a plurality of pressure vessels 202 arranged in a plurality of diametrically opposed pairs. An arm 216 is attached to both pressure vessels in each diametrically opposed pair such that each pressure vessel in each diametrically opposed pair is disposed on either end of the arm. A rotatable shaft 217 is provided in contact with each arm at a point along the arm between the two pressure vessels. Each arm is shaped to engage the shaft to impart rotational motion from the arm to the shaft during at least a portion of each rotation of each around the shaft.

Each pressure vessel has an operating pressure sufficient to hold gas at a pre-defined pressure. In one embodiment, the pre-defined pressure is at least about 2000 psi. In another embodiment, the pre-defined pressure is at least about 3000 psi. In one embodiment, each pressure is sufficient to hold at least about 80 cubic feet of the gas at the pre-defined pressure. In another embodiment, each pressure is sufficient to hold at least about 100 cubic feet of the gas at the pre-defined pressure. In one embodiment, the gas at the pre-defined pressure comprises a weight of at least about 3 pounds, preferably at least about 5 pounds, more preferably at least about 10 pounds. Suitable gases include, but are not limited to air, helium (He), neon (Ne), argon (Ar), krypton (Kr), xenon (Xe) and various refrigerant gases.

The engine also includes at least one gas compressor 214 in communication with pressure inlet 204 of each the pressure vessel through pressure lines 208, preferably when each pressure vessel is located at the pre-determined height. Suitable pre-determined heights include at least 100 feet, at least 150 feet, at least 200 feet, at least 300 feet and at least 400 feet. The arm is sized to space the diametrically opposed pairs apart a distance corresponding to this pre-determined height. Suitable gas compressors include electrical gas compressors, including energy efficient or low power gas compressors and are known and available in the art. The gas compressor is capable of compressing a gas in each pressure vessel to the pre-defined pressure. The engine can include a single gas compressor that engages the pressure inlet of each pressure vessel when that pressure vessel reaches the pre-determined height. Alternatively, the gas compressor is mounted on the arm, for example at the central axis, and is in communication with each pressure vessel. In one embodiment, a separate gas compressor is mounted on each pressure vessel.

The engine also includes a pressure relief mechanism 206 in communication with each pressure vessel, the pressure relief mechanism capable of returning the gas in each vessel to atmospheric pressure. Suitable pressure relief mechanisms include, but are not limited to, valves including pressure relief valves. In one embodiment, the engine includes at least one pneumatic powered electric generator 210 in communication with the pressure relief mechanism 206 through the pressure lines 208. Suitable pneumatic powered electric generators are known and available in the art. In one embodiment, the engine includes a gas storage tank 212 in communication with the pressure relief mechanism and the gas compressor through the pressure lines 208. The gas storage tank holds the expanded depressurized gas at atmospheric pressure, for example, when the gas used is not air, e.g., argon. In one embodiment, active or passive heat exchanges are provided in communication with the pressure vessels to assist with the transfer of heat into and out of the system resulting from the compression and expansion of the gas in the pressure vessels. Suitable active and passive heat exchangers are known and available in the art.

In one embodiment, the plurality of diametrically opposing pairs of pressure vessels is arranged as a plurality of opposed pairs of pressure vessels spaced along the length of a common rotating shaft 217. In one embodiment, the plurality of paired pressure vessels forms a circular arrangement of pressure vessels that is a coplanar arrangement aligned in a vertical plane and having a central hub around which all the pressure vessels in the circle rotate. For a given diametrically opposed pair of pressure vessels, each pressure vessel in that pair oscillates or alternates between an uppermost position and a lowermost position. When in substantially the lowermost position, the gas in a given pressure vessel is decompressed, and when in the uppermost position, the gas in a given pressure vessel is compressed.

As illustrated, the common rotatable shaft 217 has a given length, and the plurality of pressure vessels associated in pairs is spaced along this length of rotatable shaft. Each pair of pressure vessels is in communication with the shaft and can rotate about the shaft in a distinct plane that is substantially perpendicular to the shaft. Preferably, each pair of pressure vessels rotates in a separate plane, and all of the planes are substantially parallel to one another. The pressure vessel pairs are in communication with the shaft such that as the pairs rotate about the shaft, the rotational motion or momentum from the pressure vessels is imparted to the shaft as rotational motion. Preferably, each pair of pressure vessels rotates about the shaft independently of the other pairs of pressure vessels. Therefore, the different pairs can rotate simultaneously and at different speeds. In one embodiment, the rotating shaft 217 is in communication with a flywheel 219. The shaft imparts rotational movement to the flywheel when the shaft is spinning faster than the flywheel. Suitable arrangements of flywheels are known and available in the art. The flywheel maintains this rotational motion, which is communicated to one or more devices either directly of through an arrangement of gears and transmissions. Alternatively, the rotating shaft is directly connected to a device for harnessing the rotational motion of the shaft. In another embodiment, the engine includes a transmission that is in communication with the shaft and that is capable of modifying at least one of a rotational speed and a torque received from the shaft. These devices convert the rotational motion into the desired electrical work, e.g., producing an electrical current or charging batteries, or mechanical work.

As the pairs are spaced along the shaft, the engine forms an array of paired, rotating pressure vessels. The length and size of the array can be varied depending upon the engine application. A single array or banks of multiple arrays can be used in a given installation.

In one embodiment, each pair of pressure vessels in the engine includes the connecting arm 216 attached to both pressure vessels in the pair such that each pressure vessel in the pair is disposed on either end of the arm. Therefore, the engine includes a plurality of arms 216, one each for the plurality of pressure vessel pairs, and each arm is in rotatable contact with the shaft 217 at a point along the arm 216 between the two pressure vessels. In order to impart rotational motion to the shaft, the arm is arranged to engage the shaft as the arm rotates about the shaft. In one embodiment, the arm is fixed to the shaft, and both the arm and the shaft rotate together during an entire rotation. In another embodiment, the arm engages the shaft only during a portion of the rotation. At other points in the rotation, the arm spins free of the shaft. In one embodiment, each arm further includes a first part of a two-part ratchet connection, and the shaft includes corresponding second parts of the two-part ratchet connection, one second part for each arm in communication with the shaft.

Figure 3:
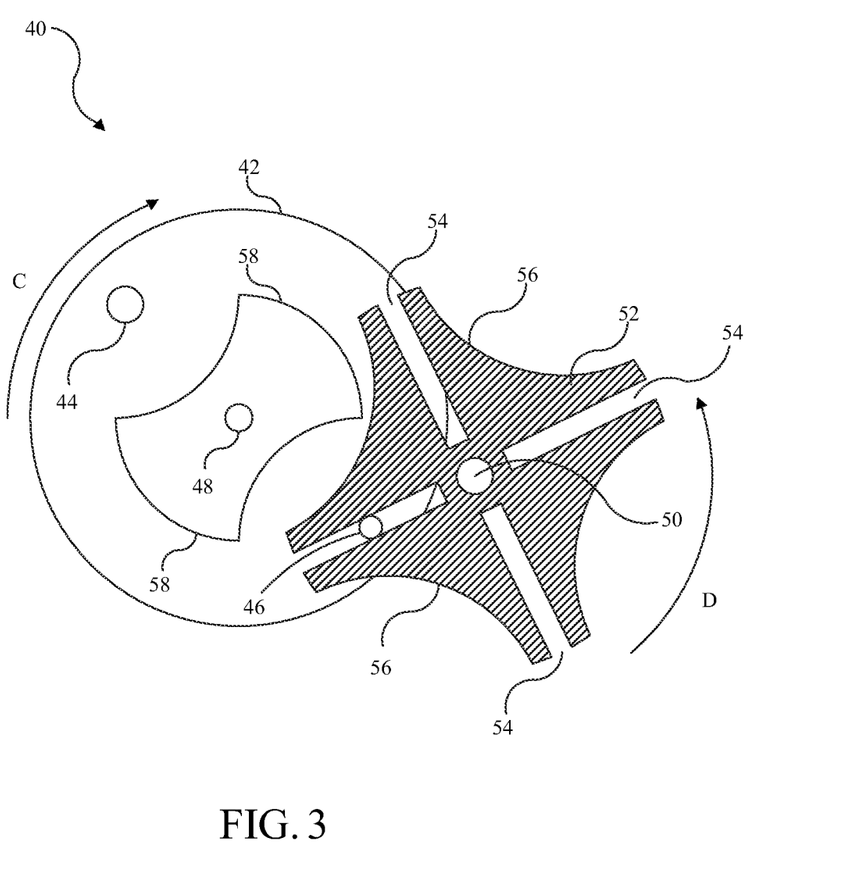
FIG. 3 is a view of an embodiment of a connection mechanism between an arm and a shaft about which the arm rotates.

In order to provide rotational engagement between the arm and the shaft, each arm includes a first part of a two-part rotating connection, and the shaft includes a corresponding second part of the two-part rotating connection in contact with the first part. Referring to FIG. 3, an exemplary embodiment of a two-part connection 40 between the connecting arm and the rotating shaft is illustrated. In accordance with this embodiment, the connecting arm includes or is connected to a first rotating connection part 42 that rotates about a first axis 48. The first rotating connection part includes a first post 44 and a second post 46 extending from the surface. The rotating shaft includes or is connected to a second rotating connection part 52 that rotates about a second axis 50. The first axis 48 is parallel to but spaced from the second axis 50. As the first rotating connection part 42 rotates in the direction of arrow C, the second rotating connection part is not rotating, and one of the first and second posts enters one of a plurality of radial slots 54 disposed in the second rotating connection part. The post travels into the slot and engages one of the sides or bottom of the slot, causing the second rotating connection part to rotate in the direction of arrow D. Since the second rotating connection part is attached to the rotating shaft, rotation of the second rotation connection part rotates the shaft. The second rotating connection part continues to rotate until the slot is positioned such that the post passes out of the slot. The second rotating connection part then stops rotating, and the first rotating connection part can continue to rotate. In one embodiment, the posts are positioned about the first rotating connection so that engagement of the posts in the slots corresponds to movement of the uppermost pressure vessel from the 3 o'clock position to the 6 o'clock position. The second rotating connection part can include a plurality of concave surfaces 56 that correspond to convex surfaces 58 on the first rotating connection. This arrangement permits relative rotation between a rotating first connection part and a stationary second connection part. The first and second connections can be in direct contact with the connecting arm and rotating shaft or are connected through one or more gears, arms or clutch mechanisms. Permitting free fall during a portion of the rotation provides for the capture of as much energy as possible as the uppermost pressure vessel moves into the lowermost position under the force of gravity.

In another embodiment, a controllable pneumatic engagement system is used. In this embodiment, a pneumatic or air driven post disposed in the rotating shaft moves outward, for example radially, from the shaft and engages a corresponding hole in the arm. Once engaged, the arm and shaft rotate together. The post would be controlled to engage the arm in the 3 o'clock position and disengage the arm in the 6 o'clock position. Other pneumatic embodiments would use a friction system, for example as found in air brakes, to selectively engage the rotating shaft and the arm.

Since each one of the plurality of pairs preferably rotates about the shaft independent of the rotation of the other pairs, in one embodiment, the engine includes a control mechanism (not shown) for synchronizing or timing the rotation of the pairs of pressure vessels about the shaft. In particular, the control mechanism prevents or inhibits a pressure vessel in the uppermost position and having a sufficient amount of weight from moving or rotating to the lowermost position. Suitable control mechanisms include, but are not limited to, electromagnets mounted on the pressure vessel or along the length of each connecting arm, mechanical holders that grasp each arm and can be controlled to release the arm and braking systems that are mounted along the shaft for example in the connection between the shaft and each arm. The control mechanism also includes a logic control unit to control the release of each pair of pressure vessels in response to one or more predefined conditions such as the expiration of a given period of time or the rotational speed of the shaft or flywheel. Suitable control mechanisms and components are known and available in the art.

Therefore, the plurality of pressure vessel pairs forms a timed array in combination with the shaft. In one embodiment, where the planes in which each pair of pressure vessels rotates are substantially vertical, and the pressure vessels can oscillate between an uppermost position and a lowermost position, such that when moving from the uppermost position to the lower most position, each pressure vessel is capable of free falling at least a portion of the distance between the uppermost position and the lowermost position, the control mechanism times when a given pressure vessel can begin a free fall from its uppermost position to its lowermost position. In one embodiment, sensors are used to determine when a given pressure vessel in the uppermost position is sufficiently full of compressed gas. The full pressure vessel can then be released based upon time or the rotational speed of the rotatable shaft or flywheel. In one embodiment, the logic control unit uses algorithms that use the temperature of the ambient air as a variable for determining how fast the upper pressure vessel will be pressurized and that calculate the maximum energy recapture based on the availability of pressurized pressure vessels in the uppermost position and the release intervals of the available pressure vessels. The control unit can also control mechanisms that remove individual pressure vessels from the wheel or belt or replace individual pressure vessels from the wheel or belt in order to provide sufficient time for pressurization and depressurization without inhibiting the continuous or regular rotation of the wheel or belt.

Figure 4:
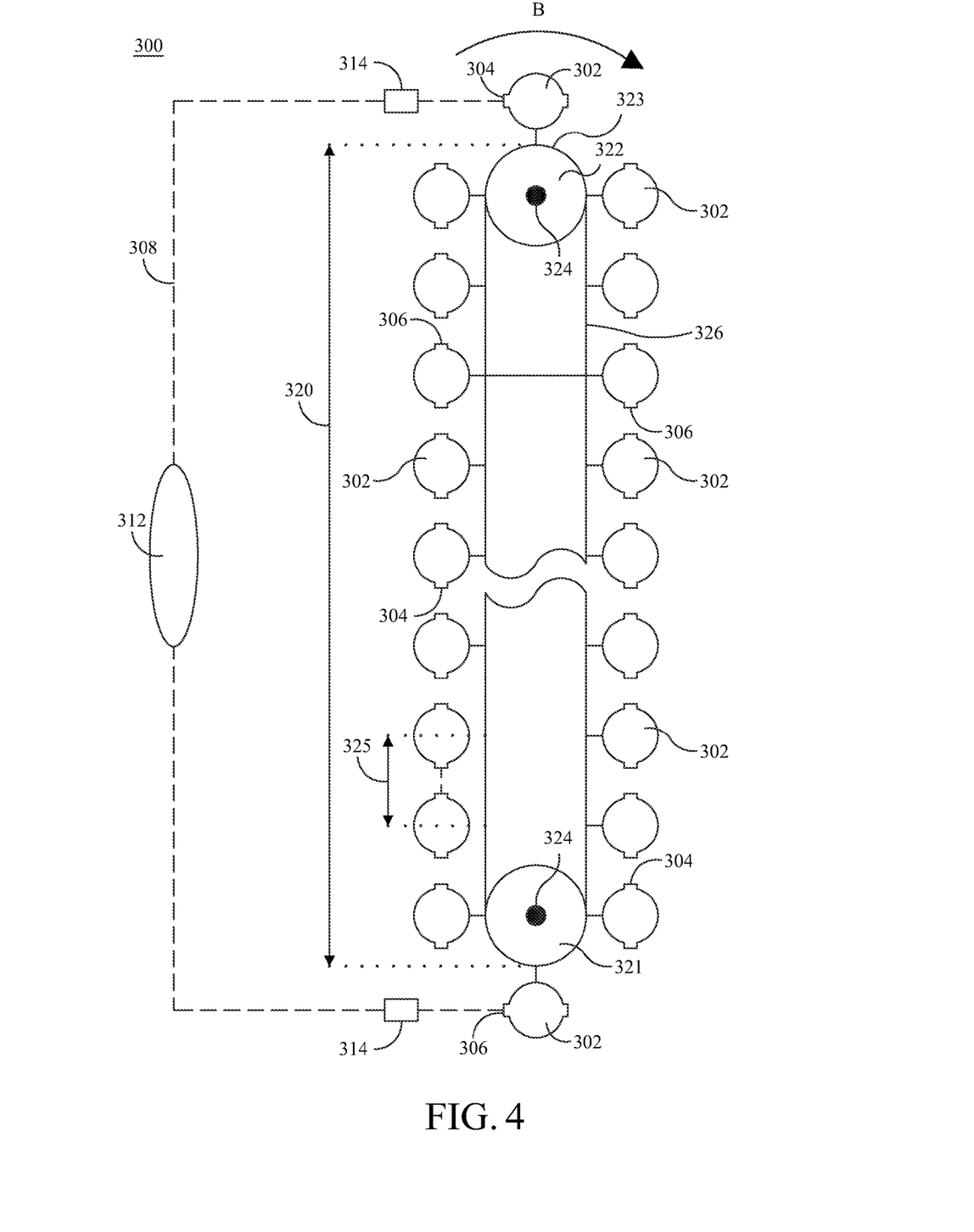
FIG. 4 is a schematic representation of an embodiment of an engine containing a pulley and belt drive mechanism.

Referring to FIG. 4, in another exemplary embodiment, the present invention is directed to an engine 300 that includes a continuous vertical conveyor 323 having a pre-determined height 320. The engine includes a plurality of pressure vessels 302 connected to the continuous vertical conveyor for transport by the continuous vertical conveyor to and from the pre-determined height. Each pressure vessel has an operating pressure sufficient to hold gas at a pre-defined pressure. In one embodiment, the pre-defined pressure is at least about 2000 psi. In another embodiment, the pre-defined pressure is at least about 3000 psi. In one embodiment, each pressure is sufficient to hold at least about 80 cubic feet of the gas at the pre-defined pressure. In another embodiment, each pressure is sufficient to hold at least about 100 cubic feet of the gas at the pre-defined pressure. In one embodiment, the gas at the pre-defined pressure comprises a weight of at least about 3 pounds, preferably at least about 5 pounds, more preferably at least about 10 pounds. Suitable gases include, but are not limited to, air, helium (He), neon (Ne), argon (Ar), krypton (Kr), xenon (Xe) and any of a number of refrigerant gases.

The engine also includes at least one gas compressor 314 in communication with pressure inlet 304 of each the pressure vessel through pressure lines 308, preferably when each pressure vessel is located at the pre-determined height 320. Suitable pre-determined heights include at least 100 feet, at least 150 feet, at least 200 feet, at least 300 feet and at least 400 feet. The arm is sized to space the diametrically opposed pairs apart a distance corresponding to this pre-determined height. Suitable gas compressors include electrical gas compressors, including energy efficient or low power gas compressors and are known and available in the art. The gas compressor is capable of compressing a gas in each pressure vessel to the pre-defined pressure. The engine can include a single gas compressor that engages the pressure inlet of each pressure vessel when that pressure vessel reaches the pre-determined height. Alternatively, the gas compressor is mounted on the arm, for example at the central axis, and is in communication with each pressure vessel. In one embodiment, a separate gas compressor is mounted on each pressure vessel.

The engine also includes a pressure relief mechanism 306 in communication with each pressure vessel, the pressure relief mechanism capable of returning the gas in each vessel to atmospheric pressure. Suitable pressure relief mechanisms include, but are not limited to, valves including pressure relief valves. In one embodiment, the engine includes at least one pneumatic powered electric generator 310 in communication with the pressure relief mechanism 306 through the pressure lines 308. Suitable pneumatic powered electric generators are known and available in the art. In one embodiment, the engine includes a gas storage tank 312 in communication with the pressure relief mechanism and the gas compressor through the pressure lines 308. The gas storage tank holds the expanded depressurized gas at atmospheric pressure, for example, when the gas used is not air, e.g., argon. In one embodiment, active or passive heat exchangers are provided in communication with the pressure vessels to assist with the transfer of heat into and out of the system resulting from the compression and expansion of the gas in the pressure vessels. Suitable active and passive heat exchangers are known and available in the art.

In one embodiment, the continuous vertical conveyor includes a first rotatable wheel 321 and a second rotatable wheel 322 disposed vertically above the first rotatable wheel. A belt 326 or chain is disposed around the first rotatable wheel and the second rotatable wheel. The rotation of the belt about the first rotatable wheel and the second rotatable wheel, for example in the direction of arrow B. moves any given point along the belt to and from the pre-determined height. The plurality of pressure vessels 302 are attached to the belt at a plurality of distinct points along the belt. In one embodiment, the plurality of distinct points are spaced apart by a distance 325 of about one foot along the belt. As the pressure vessels are pressurized at the pre-determined height, the additional weight pulls the pressure vessels downward, rotating the belt and the first and second rotatable wheels or pulleys. This rotates the central shafts 324 of the rotatable wheels. These central shafts are placed in contact with the shafts, gears or transmissions from which usable work can be derived. In one embodiment, an electrical generator is in communication with at least one of the first rotatable wheel and the second rotatable wheel.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An engine comprising:
   two pressure vessels arranged as a diametrically opposed pair, each pressure vessel containing only gas and comprising a fixed volume and an operating pressure sufficient to hold the gas at a pre-defined pressure;
   at least one gas compressor in communication with each pressure vessel, the gas compressor capable of compressing a gas in each pressure vessel to the pre-defined pressure; and
   a pressure relief mechanism in communication with each pressure vessel, the pressure relief mechanism capable of returning the gas in each vessel to atmospheric pressure.

2. The engine of claim 1, wherein the gas comprises air.

3. The engine of claim 1, wherein the gas comprises argon.

4. The engine of claim 1, wherein the pre-defined pressure comprises at least about 2000 psi.

5. The engine of claim 1, wherein the pre-defined pressure comprises at least about 3000 psi.

6. The engine of claim 1, wherein each pressure vessel is sufficient to hold at least about 80 cubic feet of the gas at the pre-defined pressure.

7. The engine of claim 1, wherein the gas at the pre-defined pressure comprises a weight of at least about 3 pounds.

8. The engine of claim 1, wherein the gas at the pre-defined pressure comprises a weight of at least about 5 pounds.

9. The engine of claim 1, further comprising:
   a plurality of pressure vessels arranged in a plurality of diametrically opposed pairs;
   an arm attached to both pressure vessels in each diametrically opposed pair such that each pressure vessel in each diametrically opposed pair is disposed on either end of the arm; and
   a rotatable shaft in contact with each arm at a point along the arm between the two pressure vessels, each arm shaped to engage the shaft to impart rotational motion from the arm to the shaft during at least a portion of each rotation of the each around the shaft.

10. The engine of claim 9, wherein each arm comprises a length of at least about 100 feet.

11. The engine of claim 1, further comprising at least one pneumatic powered electric generator in communication with the pressure relief mechanism.

12. The engine of claim 1, further comprising a gas storage tank in communication with the pressure relief mechanism and the gas compressor.

13. An engine comprising:
   a continuous vertical conveyor comprising a pre-determined height;
   a plurality of pressure vessels connected to the continuous vertical conveyor for transport by the continuous vertical conveyor to and from the pre-determined height, each pressure vessel containing only gas and comprising a fixed volume and an operating pressure sufficient to hold the gas at a pre-defined pressure;
   at least one gas compressor in communication with each pressure vessel, the gas compressor capable of compressing a gas in each pressure vessel to the pre-defined pressure; and
   a pressure relief mechanism in communication with each pressure vessel, the pressure relief mechanism capable of returning the gas in each vessel to atmospheric pressure.

14. The engine of claim 13, wherein:
   the continuous vertical conveyor comprises:
      a first rotatable wheel;
      a second rotatable wheel disposed vertically above the first rotatable wheel; and
      a belt disposed around the first rotatable wheel and the second rotatable wheel,
      wherein rotation of the belt about the first rotatable wheel and the second rotatable wheel moves any given point along the belt to and from the pre-determined height; and
   the plurality of pressure vessels are attached to the belt at a plurality of distinct points along the belt.

15. The engine of claim 14, wherein the plurality of distinct points are spaced apart by a distance of about one foot along the belt.

16. The engine of claim 14, further comprising an electrical generator in communication with at least one of the first rotatable wheel and the second rotatable wheel.

17. The engine of claim 13, wherein the pre-determined height comprises at least about 100 feet.

18. The engine of claim 13, further comprising at least one pneumatic powered electric generator in communication with the pressure relief mechanism.

19. The engine of claim 13, wherein the gas comprises argon.

20. The engine of claim 13, wherein the gas at the pre-defined pressure comprises a weight of at least about 5 pounds.

* * * * *